(12) United States Patent
Nawrocki (10) Patent No.: US 9,626,819 B1
(45) Date of Patent: Apr. 18, 2017

(54) TESTER FOR DETECTING GRAPHENE SECURITY ELEMENT IN A SECURITY DOCUMENT, AND THE ELEMENT DETECTION METHOD

(71) Applicant: Piotr Nawrocki, Inowroclaw (PL)

(72) Inventor: Piotr Nawrocki, Inowroclaw (PL)

( * ) Notice: Subject to any disclaimer, the term of this patent is extended or adjusted under 35 U.S.C. 154(b) by 0 days.

(21) Appl. No.: 14/864,724

(22) Filed: Sep. 24, 2015

(51) Int. Cl.
*G06K 7/10* (2006.01)
*G07D 7/12* (2016.01)

(52) U.S. Cl.
CPC .................................... *G07D 7/12* (2013.01)

(58) Field of Classification Search
USPC .................. 235/468, 493; 283/94, 73, 67
See application file for complete search history.

(56) References Cited

U.S. PATENT DOCUMENTS

| | | | | |
|---|---|---|---|---|
| 2011/0255750 A1* | 10/2011 | Wunderer | | G07D 7/166 382/112 |
| 2014/0151996 A1* | 6/2014 | Camus | | D21H 21/40 283/67 |
| 2015/0224809 A1* | 8/2015 | Tompkin | | G02B 5/1866 283/73 |
| 2016/0075164 A1* | 3/2016 | Sarrazin | | D21H 21/44 283/94 |
| 2016/0096393 A1* | 4/2016 | Chapman | | B42D 25/29 283/73 |

* cited by examiner

*Primary Examiner* — Allyson Trail
(74) *Attorney, Agent, or Firm* — Masuvalley & Partners (57) ABSTRACT

A tester is described for detecting a graphene security element in a secure document, such as a banknote, an identification card, etc. as well as a method for detection of that element. In the tester the light emitter, the reflective/transreflective element and the photodetector are arranged in the measuring slot in such a way that detection of the level of absorption and/or refraction of light passing through a graphene security element is possible and the measurement result when compared with the model provides a basis for generation of a message about the detection result, i.e. the confirmation of authenticity of a security document or information that the document is counterfeited. The tester can preferably be used in combination with a mobile device, such as a smartphone, which together form the measuring system.

7 Claims, 8 Drawing Sheets

TESTER FOR DETECTING GRAPHENE SECURITY ELEMENT IN A SECURITY DOCUMENT, AND THE ELEMENT DETECTION METHOD

FIELD OF THE INVENTION

The present invention is a tester for detecting a graphene security element in a security document, such as a banknote, an identification card, etc., and a graphene security element detection method in the security document.

BACKGROUND

Security documents, such as, in particular banknotes, securities, identity cards, identification cards, payment cards, etc. are supplied with a variety of security features to protect them against counterfeiting. Counterfeiting of security documents can be minimized by applying a variety of security features to a document of value so that expenditures associated with counterfeiting are as high as possible, making possible forgery operation as difficult and costly as possible, and optimally—unprofitable. Because forged documents are often executed using another (usually cheaper) technology and/or other materials than the originals, an effective safety element should be impossible to reproduce accurately using a different technology and/or using other materials than originally used. The security element should also be durable to use and recognizable for machines and equipment. At the same time its production/introduction into the structure of a security document should be as inexpensive as possible and should provide the possibility to easily integrate with existing production processes.

There are three levels of security:
a) the first degree—security based on organoleptic properties—for users who do not have any additional tools or equipment;
b) the second degree—securities verified using basic tools, e.g. magnifying glass, UV lamp, etc.;
c) the third degree—security verified by experts (specialists) in appropriately equipped laboratories.

The oldest security elements used to date are all kinds of watermarks, easy to implement during the production of paper and practically impossible to produce on finished paper. Another technical element is opaque materials used for the execution of a document. Sometimes these additions can be used as markers in addition to the security functions. Covering materials with different additions, whose composition is the secret of the producer and the user, are the most common security. They are often placed on the border of a security available (recognizable) for an average document user, and security elements recognised by a special device only.

The used security features include:
special, secret recipe paper conferring specific mechanical and optical properties;
replacing paper with polymer substrate difficult to print on;
the use of microprinting;
recto-verso, i.e. printing on both sides, in which a picture visible in the lumen is created with the finely fitting elements located on both sides of a sheet, e.g. a banknote.
a description on the recto;
metallic foil hot-stamping (hot stamping) with a holographic model;
embossment resulting from intaglio printing;
complex graphics, yet distinct, with strong saturation and gloss paint;
watermark, especially visible against the light;
a security thread in the form of a metal strip inserted within the paper structure with spacing forming an inscription;
printing with an optically variable ink—seen in front and at a sharp angle it changes colour;
ribbing;
drawings visible under UV light.

As modern analytical methods allow you to easily examine the structure of each thin-film product, effective protection should be based more on process. At present optimal security solutions for value documents against counterfeiting include a combination of traditional methods, IT technology and materials technology that uses nanomaterials.

Although the features of security elements to be verified either by a user or a machine are characteristics associated with the mechanical, electrical and thermal conductivity properties, etc., the features of the widest range of applications are optical properties of the security element.

The contents of U.S. Pat. No. 3,910,701 present a method and a tester for measuring the refractive index, absorption and/or light transmission, provided with a light emitting diode (LED) emitting light of different wavelengths and directing them to the test element, and at least one element sensitised, which is reached by light of each of the LEDs reflected from the surface and/or penetrating through the test piece. The described tester further comprises control means to the separate LEDs, which allows, among others, determination of the relative reflectance of various elements of the test at a particular wavelength, the differential reflectance for one test element at two different wavelengths and the permeation and absorption parameter corresponding to these measurements and the relative differential.

On the other hand, U.S. Pat. No. 5,894,352 discloses a method and a tester for determining the level of absorption of light in the light transmitting optical elements. The method is based on the measurement of the temperature rise of the optical element resulting from absorption of light.

Furthermore, DE 10126722 A1 discloses a hand-held device for testing the authenticity and/or validity of security document such as admission tickets or travel tickets. The device comprises a reader to move a security document through it and read information and/or security features contained in this document and a testing component, which verifies the authenticity and/or validity of a security document based on data recorded by the reader.

In parallel with the development of increasingly complex and difficult to counterfeit security features against counterfeiting, there is a continuing need for possible simple to use, compact, versatile, and independent testers and methods for detecting such high-tech security elements in security documents. As a rule, the operation of verifying the authenticity of a security feature in the tested document cannot lead to damage of the structure of the document.

One modern type of document security against counterfeiting are nanomaterials introduced directly into the structure of a security document (paper, plastic), or contained in a separate security element arranged on or within the structure of the document.

The nanomaterials with properties that are particularly useful in the field of document security against counterfeiting include graphene, which is a flat structure made of carbon atoms connected in hexagons. Graphene shows, among others, linear dependence of dispersion, resulting in a unique light absorption. Light absorption occurs when an electron from the valence band can absorb a photon (the photoelectric effect). This is possible if the energy difference between the point of the valence band and conduction is the same as the energy of the photon. In graphene in the area called "point K" there is a linear dispersion dependence and closed energy slot, which means that each wavelength of light (each colour) in the range of from near infrared to ultraviolet light can be absorbed by graphene, as there will always be an electron, which can absorb a photon. Furthermore, the probability of absorbing each wavelength of light is the same. Since the graphene is a single layer material, it absorbs only a very small part of the incident light (2.3%) and thus is a material having a high degree of translucency (transparency), and at the same time a material having a very strong absorption of light (as for such a thin structure).

The graphene security feature can be completely transparent or in the case of the need to obtain visualisation, it can have a form which is visible to the human eye.

Examples of graphene structures in security features include:
(a) a layer of graphene (two-dimensional or structured, e.g. nanotubes) arranged between two polymer layers;
(b) a layer of doped graphene (two-dimensional or structured, e.g. nanotubes) arranged between two polymer layers.

The structure of graphene in a security element may be supplemented by the so-called quantum dots. Quantum dots (QD) are semiconductor nanocrystals with sizes ranging from 2-10 nm. Just as semiconductors, quantum dots absorb photons of light with such energy that gives you the ability to transfer electrons from the non-activated to one of the higher available energy levels. Otherwise, there is an emission process, because the wavelength emitted by light depends on the size of the dots. Hence, having a semiconductive material we can get markers having different colours, which are characteristic of quantum dots.

The radiation may be absorbed by quantum dots in a broad spectral range, whereas their molar absorption coefficient increases towards the UV. Thus the excitation can be made of many kinds of dots using one light source, since there is no requirement to apply excitation at a pre-set wavelength. In turn, the profile of the fluorescence emission of quantum dots is narrow and has a small half-width value (FWHM 125 nm). This allows for simultaneous use of multiple markers having different colours without fear of overlapping of the signals. The nanocrystals can be repeatedly excited, with no noticeable decrease in fluorescence because they have a high quantum yield of fluorescence and long radiation (10-100 ns).

The structure of the nanocomposite material comprising a graphene security element takes into account:
the use of a variable number of layers of polymer in the material—the number of coats applied is dependent on the conditions in which the security element will operate.
The use of a variable number and size of the graphene quantum dots, if the use such structure gives is necessary to increase the efficiency of the security feature.

Graphene security elements, as well as other such security elements have a uniquely shaped design, preferably forming a specified image. This shape is applied in the production process on the transparent polymer substrate. The process of applying the layer of a nanocomposite is compatible with the application methods for the corresponding polymers. The thus obtained security elements are then placed in known manner in the structure of security documents.

The objective of the invention is to provide a tester and detector of a graphene security element in a security document, such as a banknote, an identification card, etc., allowing for a simple, rapid and reliable verification of the authenticity of this document. This objective has been achieved by applying the solution set out in the appended claims.

SUMMARY OF THE INVENTION

The present invention is a tester for detecting a graphene security element in a security document, provided with a power module, a control module, an internal memory module, a measuring slot, a specific wavelength light emitter, a reflective/transreflective element and a photodetector. The tester in accordance with the invention has an additional data acquisition control module and a control unit, wherein:
the control module is connected to the power module, the light emitter, the data acquisition control module and the control module,
the reflective/transreflective element is connected to the light emitter, the photodetector and the control module,
the photodetector is further connected to the data acquisition control module,
the internal memory module is connected to the data acquisition control module,
the light emitter, the reflective/transreflective element and the photodetector are disposed in the measurement slot in such a way that when a security document or a fragment thereof comprising a graphene security element is inserted into the measurement slot in order to verify the authenticity of the security document, the light coming from the emitter via the reflective/transreflective element after reflection from and/or passing through the graphene security element goes to the photodetector.

In one of the preferred embodiments, the tester according to the invention further comprises at least one communication module for wireless data exchange with a mobile device equipped with an LCD/LED display, especially a smartphone. In preferred embodiments of the tester according to the invention the communication module is (i) a Bluetooth module connected to the control module and/or (ii) an optical sensor connected to the reflective/transreflective element and the control module.

In another preferred embodiment, the tester according to the invention additionally has a LED/LCD unit connected to the control module.

In yet another preferred embodiment, the tester according to the invention additionally has a fingerprint reader connected to the control module and the reflective/transreflective element.

The present invention also provides a method for detecting a graphene security element in a security document using a tester according to the invention as defined above, in which method includes:
the tester power supply is started,
an initial check of the presence of the security document in the measuring slot is carried out,
the light emitter is started,
the level of absorption and/or refraction of light passing through the security element is measured,
the result of the measurement is recorded,
and a message about the result of detection is generated.

In one preferred embodiment of the method of the invention, the tester according to the invention as defined above is used, wherein the measurement result registration it is transmitted via the communication module to a mobile device provided with an LCD/LED, in particular a smartphone, then the measurement result is compared with a model stored in a database and a message about the result of detection is generated on the mobile device display. In a preferred embodiment of the method according to the invention, before starting the tester power supply, the tester is deposited on the case of the mobile device.

In a further preferred embodiment of the method according to the invention an external database is used as a database, in particular such published in the Internet, and the comparison of the measurement result with a model stored in the database is preceded by a mobile device establishing a wireless connection to this database. Alternatively, in another preferred embodiment of the method according to the invention a database stored in the memory of the mobile device is used as a database.

In a further preferred embodiment of the method of the invention, the tester defined above according to the invention provided with a LED/LCD unit is connected to a control unit, and irrespective of the messages generated by means of separate devices such as, in particular a mobile device, the detection result is generated by the tester LED/LCD unit.

In a further preferred embodiment of the method of the invention the tester defined above according to the invention provided with a fingerprint reader connected to the control module and the reflective/transreflective unit, in which method immediately after starting the tester power supply a user fingerprint scan is performed using a fingerprint reader, which is part of the tester, the result of the reading is compared to the model in the tester memory and depending on the result of the comparison continues with further stages of the process—when the fingerprint reading is consistent with the model, or the tester operation shuts down—when the fingerprint reading is not compatible with the model.

In another preferred embodiment of the method according to the invention, the tester is used in combination with a mobile device provided with a fingerprint reader, and immediately after starting the tester power supply using the communication module a wireless connection with the mobile device is established, then by means of the mobile device fingerprint reader, a user fingerprint scan is performed and the result of the reading is compared to the model in the tester memory and/or the mobile device, and depending on the result of the comparison, continues with further stages of the process—when the fingerprint reading is consistent with the model, or the tester operation shuts down—when the fingerprint reading is not compatible with the model.

BRIEF DESCRIPTION OF THE DRAWINGS

Exemplary embodiments of the invention are described with reference to the accompanying drawings, in which.

The figures use the following indications: 1—power supply module; 2—control unit; 3—internal memory module; 4—measuring slot; 5—emitter of light at a specific wavelength; 6—reflective/transreflective module; 7—photodetector; 8—LED/LCD; 9—data acquisition control module; 10—fingerprint reader; 11—control module; 12—optical sensor; 13—Bluetooth module; 15—tester switch; 20—graphene nanocomposite elastic layer; 21—polymeric substrate of the security element; 22—graphene security element; 23—security document; A—light absorption level detection in a graphene security element; B—comparing the measurement result with the model in an external database; C—generating a message of the detection result through a mobile application.

DETAILED DESCRIPTION OF THE INVENTION EMBODIMENTS

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

Figure 1:
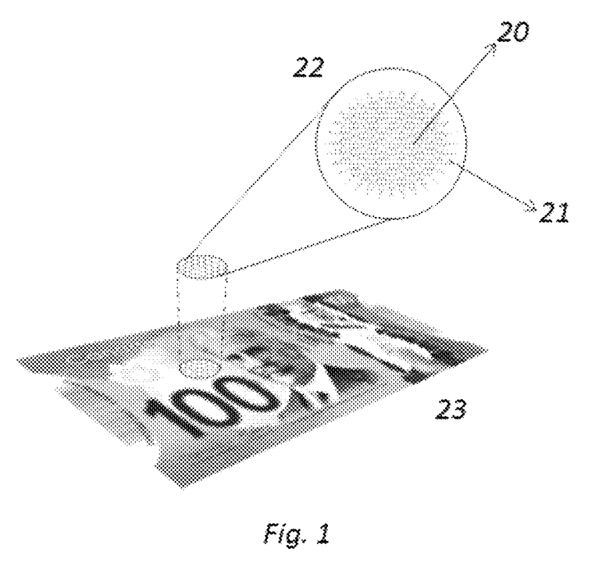
FIG. 1 illustrates an example of application of a graphene security feature in a security document (a banknote)

FIG. 1 shows an example of application of a graphene security element 22 in the structure of the security document 23, here in the form of a banknote, wherein in the graphene security element 22 includes the graphene nanocomposite elastic layer 20 etched in a freely designed shape is disposed on the polymeric substrate 21 of the security element 22.

Figure 2:
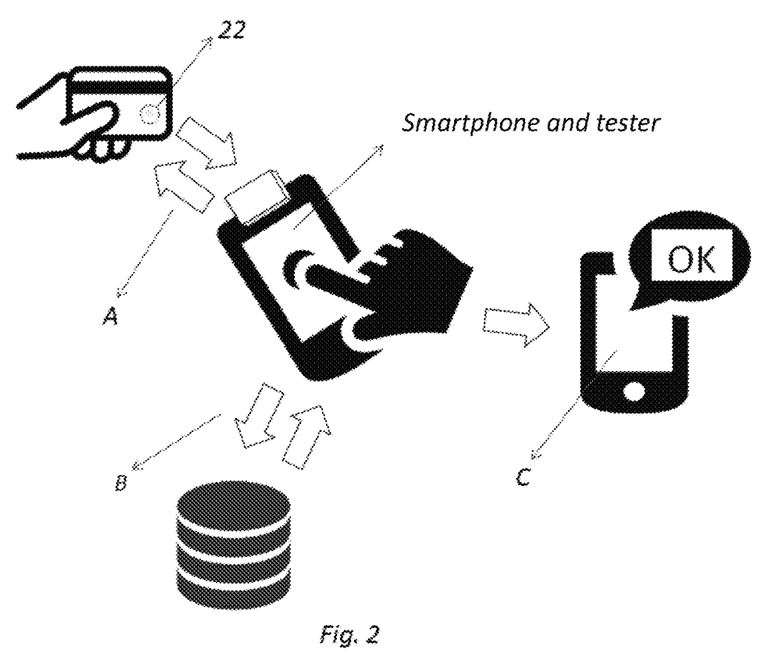
FIG. 2 illustrates an embodiment of a method for detecting a graphene security element using a smartphone by an on-line method.

FIG. 2 shows a variant of the method according to the invention using a smartphone as a mobile device using an on-line method. In this variant, after placing a graphene security element 22 in the measuring slot of the tester mounted on the smartphone case the process of A starts—light absorption level detection in the graphene security element 22.

After the measurement is taken and the measurement result is transferred to the smartphone, a wireless connection of the smartphone with an external database and process B is started—comparing the measurement result with the model in an external database, then the process C—a message of the result of detection is generated through the mobile application, here completed successfully by displaying the message "OK" on the smartphone LCD/LED. The term "on-line" means that the external database is available via the Internet.

Figure 3:
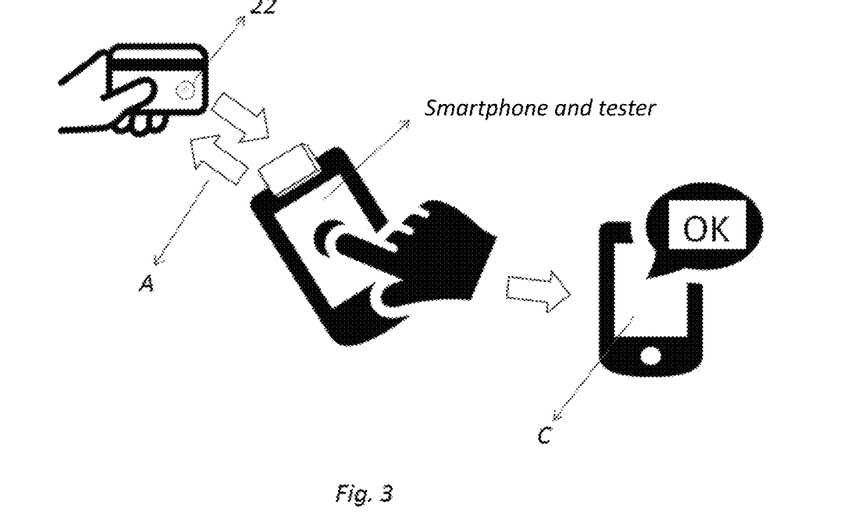
FIG. 3 illustrates an embodiment of a method for detecting a graphene security element using a smartphone by an off-line method.

FIG. 3 shows a variant of the method according to the invention using a smartphone as a mobile device using an off-line method. This method is substantially similar to the on-line method (FIG. 2), but in this case as a database stored in the smartphone memory is used as the database, and therefore the method according to this embodiment of the invention is performed without connecting to the Internet.

Figure 4:
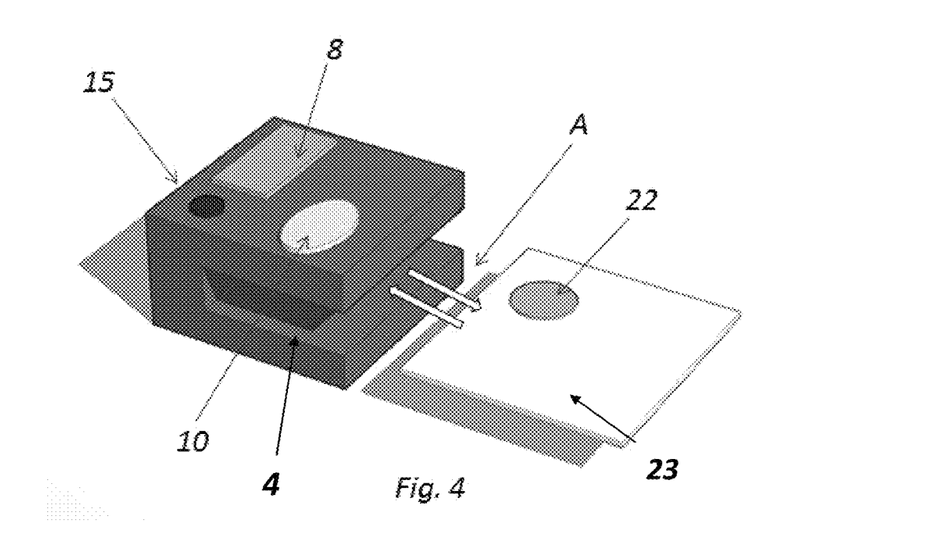
FIG. 4 illustrates an embodiment of a method for detecting a graphene security element without using a smartphone.

FIG. 4 shows an embodiment of the invention without the use of a smart phone, i.e. only using the tester of the present invention. In the detection variant illustrated here is in a limited access mode. When the tester is turned on using the switch 15, the user puts his finger to the fingerprint reader 10 on the tester case, and after the positive result of the verification of user identity (i.e. recognition of the user by the tester as a person entitled to use it) and placing the security document 23, or fragment thereof containing the security element 22 in the measuring slot 4, process A starts—detection of the level of light absorption in the graphene security feature 22. The detection result, and thus the result of comparing the measurement result with the model in the database of the tester is generated in LED/LCD module 8.

Figure 5:
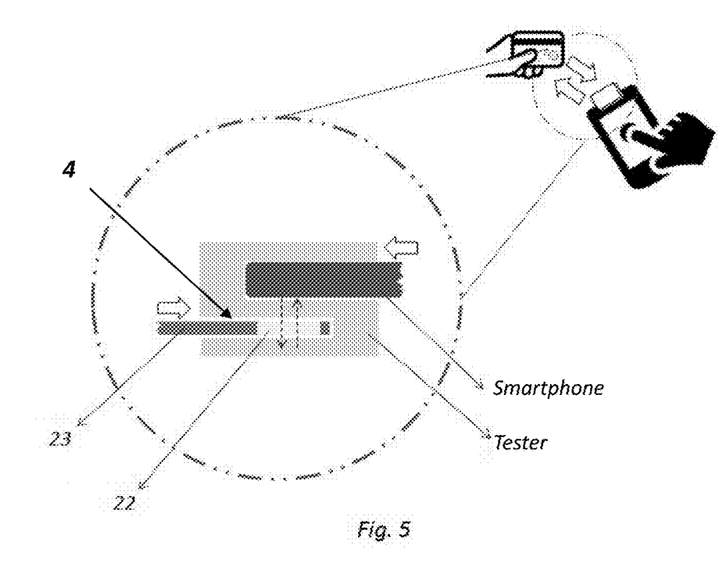
FIG. 5 illustrates an embodiment of a method for detecting the level of light absorption in a graphene security element using a smartphone.
Figure 6:
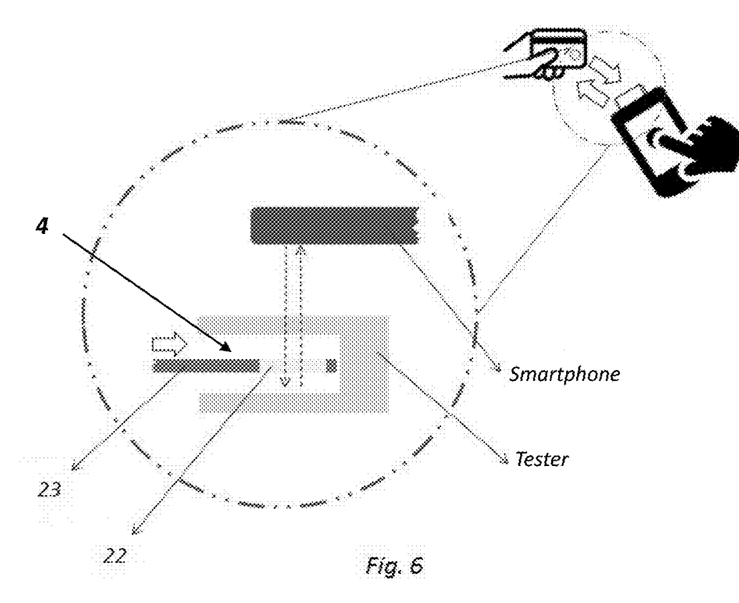
FIG. 6 illustrates another embodiment of a method for detecting the level of light absorption in a graphene security element using a smartphone.
Figure 7:
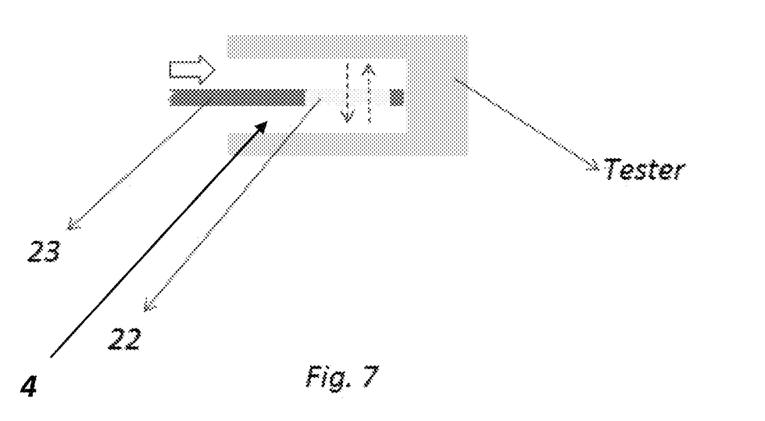
FIG. 7 illustrates a variant of a method for detecting the level of light absorption in a graphene security element without using a smartphone.

FIG. 5 shows a variant of the method in detecting the level of light absorption in the graphene security element 22 using a smartphone, wherein the tester is mounted as an accessory on the smartphone case. In FIG. 6 shows a variant of the method, wherein the tester only neared to the smartphone. In turn FIG. 7 shows the process of a method for detecting the level of light absorption in the graphene security element 22 without the use of a smart phone, i.e. only by using the tester of the present invention.

Figure 8:
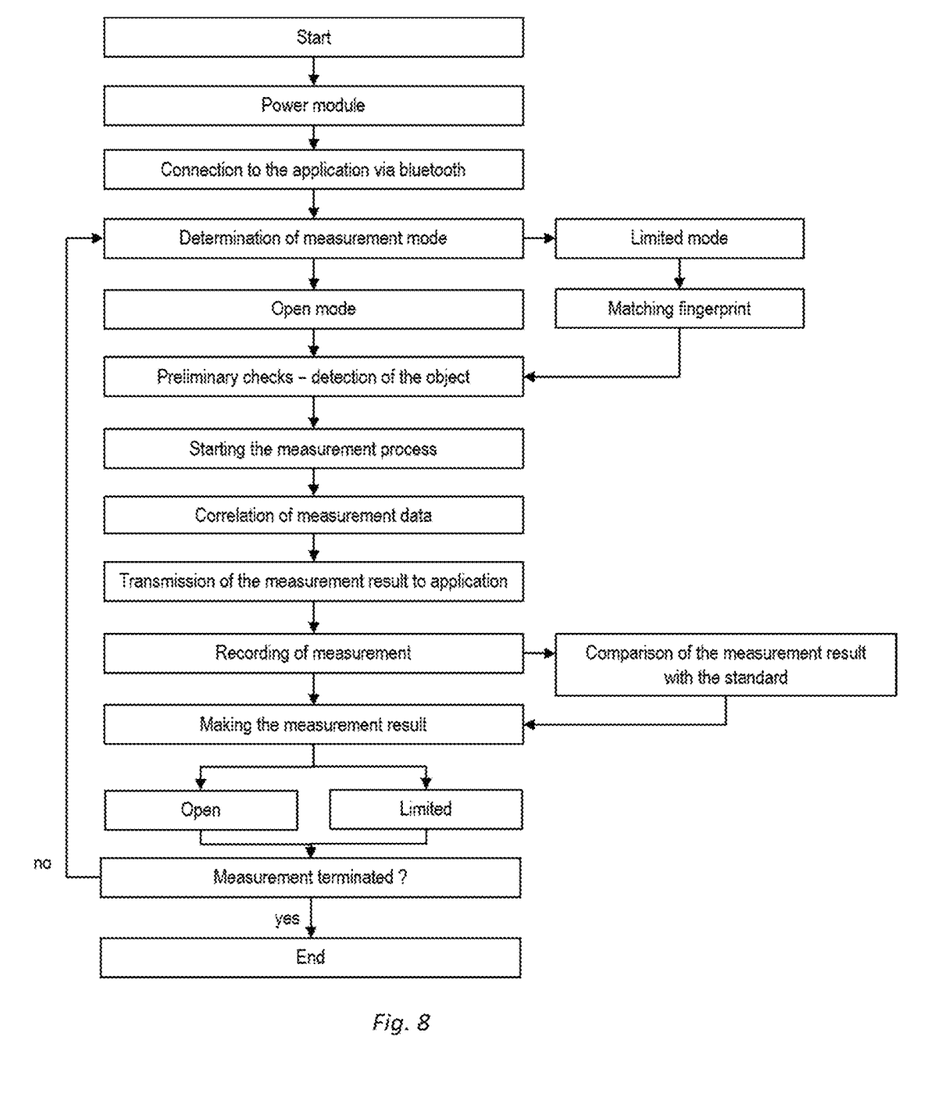
FIG. 8 shows a block diagram of the measuring functions of graphene security element detection in the on-line method of FIG. 2.
Figure 9:
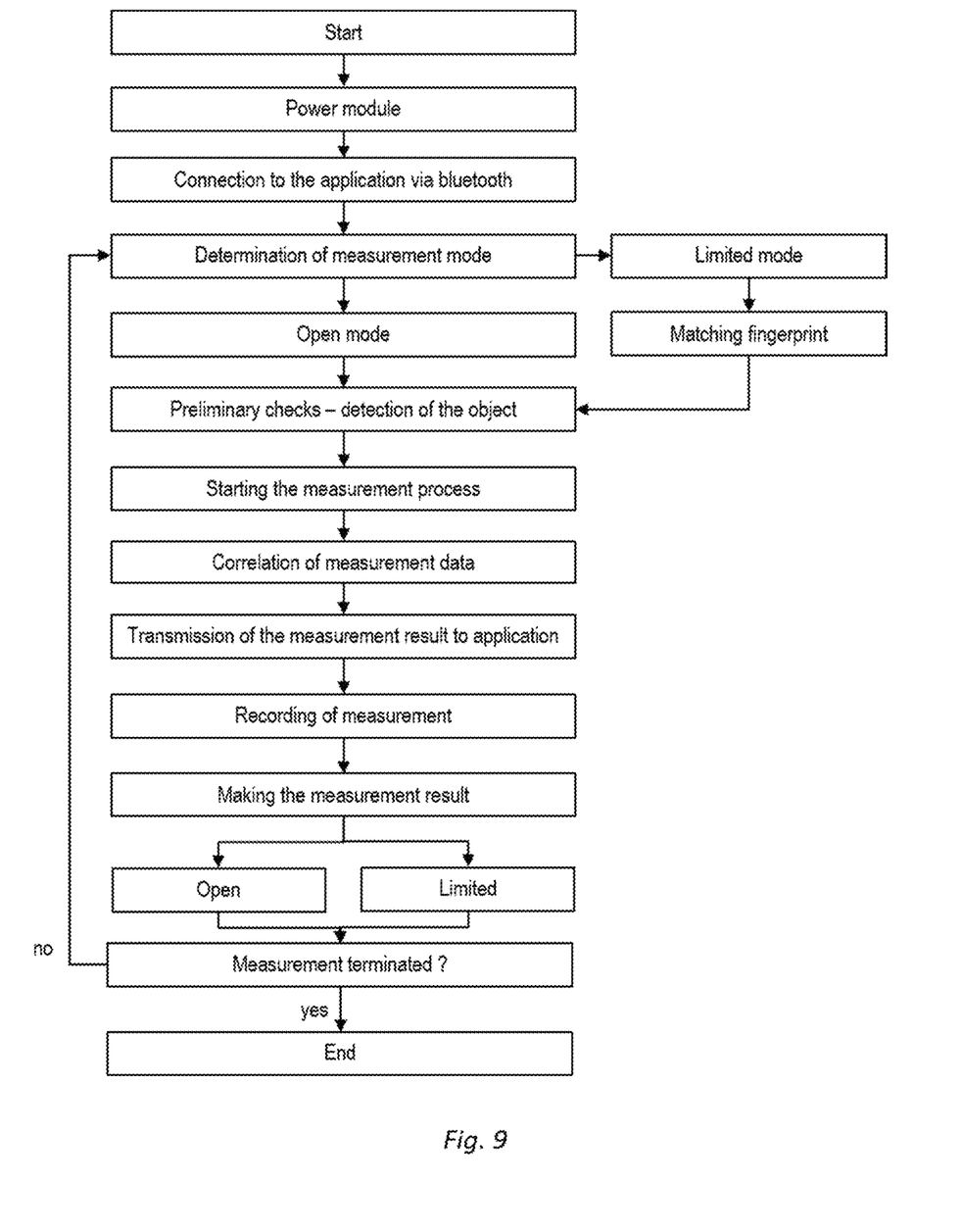
FIG. 9 shows a block diagram of the measuring functions of graphene security element detection in the off-line method of FIG. 3.
Figure 10:
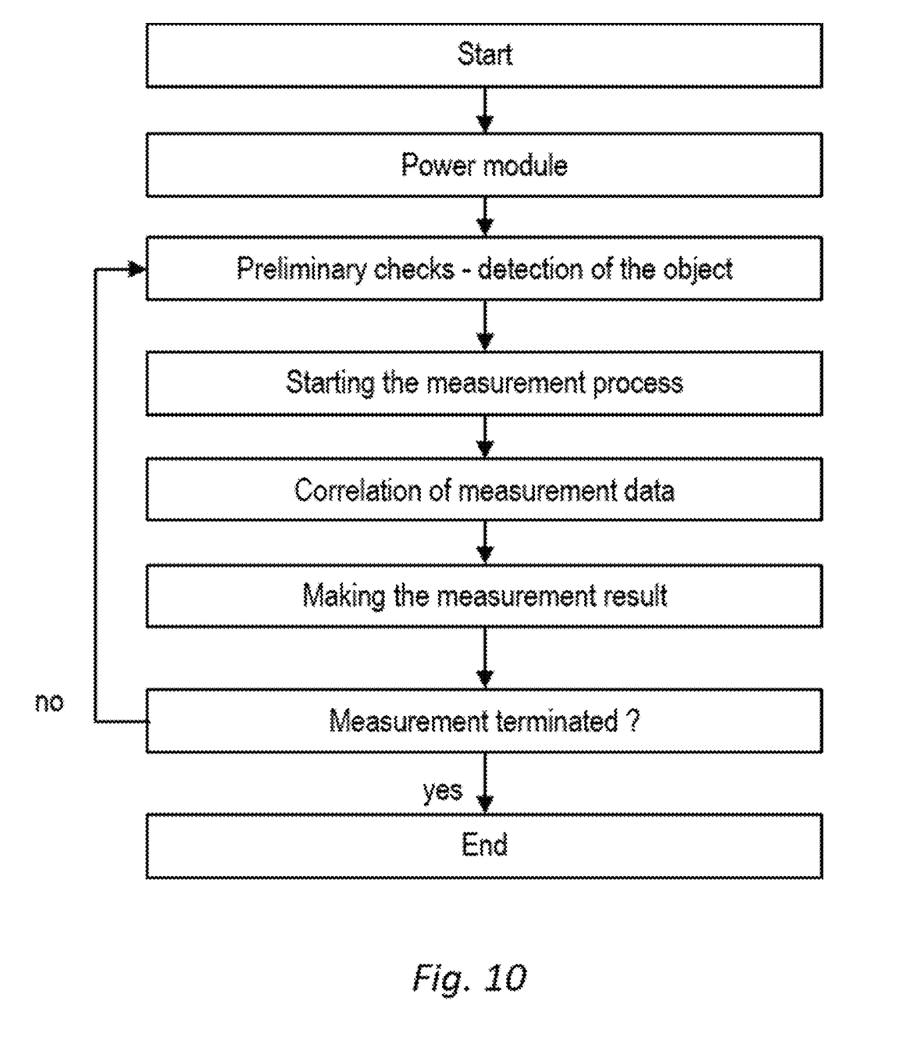
FIG. 10 shows a block diagram of the measuring functions of graphene security element detection in the method without using a smartphone.

FIG. 8 shows a block diagram of the measuring functions of graphene security element 22 detection in the on-line method of FIG. 2, and FIG. 9—a corresponding diagram for an off-line method of FIG. 3. In both versions at the stage of determining the measurement mode, in the case of a limited mode the step further conditioning the process is a positive identification of the user permissions, implemented through reading a fingerprint. In FIG. 10 shows a block diagram of the measuring functions of graphene security element 22 detection of the method without using a smartphone, i.e. in accordance with the embodiment of FIG. 7. In the implementation of the detection process in limited access mode, in the diagram between the step of the system power supply and the initial control of the presence of the object of detection there is an additional step of determining the measurement mode as a limited measurement and verification of the user identity according to the embodiment illustrated in FIG. 4.

Figure 11:
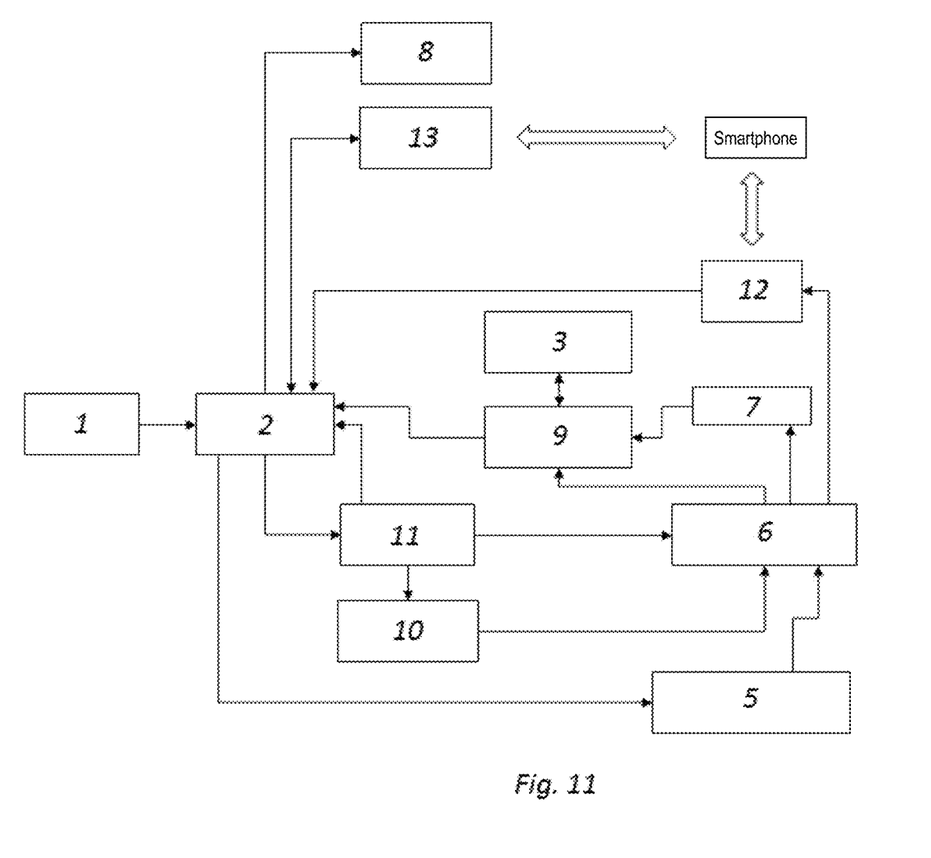
FIG. 11 shows a schematic diagram of the tester according to the invention.

FIG. 11 is a schematic diagram of a tester according to the invention for implementation of the embodiment of the invention in each of the three major methods described above, i.e. using a smartphone in an on-line method (FIG. 8) using a smartphone in an off-line method (FIG. 9) and without using a smartphone (FIG. 10) together with several variants thereof. According to the embodiment shown in FIG. 11, the tester according to the invention is provided with the power supply module 1, the control module 2, the internal memory module 3, the measurement slot 4, the emitter of light of a specific wavelength 5, the reflective/transreflective element 6, the photodetector 7, the data acquisition control module 9 and control unit 11. The control unit 2 is connected to the power supply module 1, the light emitter 5, the data acquisition control unit 9 and the control module 11. The reflective/transreflective element 6 is connected to the light emitter 5, the photodetector 7, and the control module 11. The internal memory module 3 is connected to the data acquisition control module 9. The light emitter 5, the reflective/transreflective element 6 (such as, in particular, the mirror element or a semipermeable optical element) and the photodetector 7 are arranged in the measuring slot 4 in such a way that when a security document or fragment thereof comprising a graphene security element is inserted into the measuring slot 4 in order to verify the authenticity of the security document, the light coming from the emitter 5 via the reflective/transreflective element 6 after reflection from and/or passing through the graphene security element goes to the photodetector 7. The tester shown in FIG. 11 has two communication modules for wireless data exchange with the mobile device equipped with a LCD/LED, in this case—a smartphone, wherein one of the communication modules is a Bluetooth module 13 connected to the control module 2, and the second communication module is an optical sensor 12 engaged with the reflective/transreflective element 6 and the control unit 2. As a rule for data exchange with the mobile device one communication module is sufficient, but the use of several (e.g. two) different communication modules using different technologies for wireless data transmission increases the possibility of adjusting the method of use of the tester according to the invention to a user's specific needs/preferences. The tester shown in FIG. 11 has a LED/LCD 8 connected to the control module 2, enabling the implementation of the method according to the invention in the embodiment without the use of a smartphone. In addition, the tester has a fingerprint reader 10 connected to the control module 11 and a reflective/transreflective element 6, which enables the measurement in a limited access mode, i.e. only by an authorised user.

For graphene security elements the border absorption value is 2.3% of the radiation incident on the security element.

The tester and method of the invention can be used to verify the authenticity of any security documents, using at least one graphene security element. Examples of these types of security documents include: banknotes; passports (security element can be an integral part of the cover); credit cards, driving licenses, ID cards or other documents in the form of plastic cards (the security element is in the top layer of the card); excise prints and bands; personal identifiers; securities; license documents, certificates; high value product labels especially susceptible to counterfeiting.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

The invention claimed is:

1. A tester for a graphene security element detection in a security document, comprising:
   a power supply module,
   a control module,
   an internal memory module,
   a measurement slot,
   an emitter of a specific wavelength light,
   a reflective/transreflective element,
   a photodetector, a data acquisition control module, and,
a control unit, wherein:
   said control module is connected to the power supply module, the emitter of light, the data acquisition control module, and the control module,
   the reflective/transreflective element is connected to the light emitter, the photodetector and the control module,
   the photodetector is further connected to the data acquisition control module,
   the internal memory module is connected to the data acquisition control module,
   the light emitter, the reflective/transreflective element and the photodetector are arranged in the measurement slot in such a way that when a security document or a fragment thereof comprising a graphene security element is inserted into the measurement slot to verify the authenticity of the security document, the light coming from the emitter via the reflective/transreflective element after being reflected from and/or passing through the graphene security element goes to the photodetector.

2. The tester according to claim 1, further comprising at least one communication module for wireless data exchange with a mobile device equipped with an LCD or an LED.

3. The tester according to claim 2, wherein the communication module is a Bluetooth module connected to the control module.

4. The tester according to claim 2, wherein the communication module is an optical sensor connected to a reflective/transreflective element and a control module.

5. The tester of claim 1, wherein the tester additionally has an LED/LCD unit connected to the control module.

6. The tester of claim 1, wherein the tester further has a fingerprint reader connected to the control module and the reflective/transreflective element.

7. The tester according to claim 1, further comprising at least one communication module for wireless data exchange with a smartphone.

\* \* \* \* \*